United States Patent
Lee et al.

(10) Patent No.: US 7,312,559 B2
(45) Date of Patent: Dec. 25, 2007

(54) STATOR AND CERAMIC TUBE TYPE ULTRASONIC MOTOR USING THE SAME

(75) Inventors: Dong Kyun Lee, Seoul (KR); Burhanettin Koc, Suwon (KR); Byung Woo Kang, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/500,369

(22) Filed: Aug. 8, 2006

(65) Prior Publication Data

US 2007/0029898 A1 Feb. 8, 2007

(51) Int. Cl.
*H02N 2/00* (2006.01)
(52) U.S. Cl. ............... 310/367; 310/368; 310/328; 310/331; 310/323.01; 310/323.04; 310/323.17
(58) Field of Classification Search ........... 310/323.01, 310/323.02, 323.04, 323.06, 323.17, 328, 310/331, 367, 368
See application file for complete search history.

(56) References Cited

U.S. PATENT DOCUMENTS

| 2,271,200 | A | * | 1/1942 | Mason ................. 333/192 |
| 2,439,499 | A | * | 4/1948 | Williams et al. ........... 310/331 |
| 3,146,367 | A | * | 8/1964 | McNaney ................. 313/410 |
| 4,523,120 | A | * | 6/1985 | Assard et al. ........... 310/323.17 |
| 4,525,645 | A | * | 6/1985 | Shirley et al. ............. 310/337 |
| 4,630,941 | A | * | 12/1986 | Chainer et al. ............. 384/1 |
| 5,747,915 | A | * | 5/1998 | Benavides ............... 310/331 |
| 2005/0082947 | A1 | * | 4/2005 | Li et al. ................ 310/328 |
| 2006/0049720 | A1 | * | 3/2006 | Henderson et al. ......... 310/328 |

FOREIGN PATENT DOCUMENTS

| JP | 62-256509 | * | 9/1987 |
| JP | 2-36772 | * | 2/1990 |
| JP | 11-285278 | | 10/1999 |
| JP | 11-289781 | | 10/1999 |

OTHER PUBLICATIONS

"Squeeze Bearing With Sleeve Member Having Slit", IBM Technical Disclosure Bulletin, Dec. 1, 1984, vol. 27, Issue No. 7A, pp. 3916-3917.*

* cited by examiner

*Primary Examiner*—Thomas M. Dougherty

(57) ABSTRACT

The present invention relates to a ceramic tube type ultrasonic motor having a stator including a tube-type elastic body that is formed of a ceramic material; and a plurality of piezoelectric diaphragms that are attached on the outer peripheral surface of the elastic body in a longitudinal direction thereof and to which voltages having a phase difference are respectively applied and a rotor that is rotated by the friction with the elastic body flexurally vibrating due to the voltages applied to the plurality of piezoelectric diaphragms.

8 Claims, 2 Drawing Sheets

STATOR AND CERAMIC TUBE TYPE ULTRASONIC MOTOR USING THE SAME

CROSS-REFERENCE TO RELATED APPLICATIONS

The application claims the benefit of Korea Patent Application No. 2005-0072091 filed with the Korea Intellectual Property Office on Aug. 8, 2005, the disclosure of which is incorporated herein by reference.

BACKGROUND OF THE INVENTION

1. Field of the Invention

The present invention relates to a stator and a ceramic tube type ultrasonic motor using the same. In the stator, an elastic body producing friction with a rotor is formed of a ceramic material having excellent abrasion resistance instead of a metallic material, thereby minimizing abrasion caused by the friction.

2. Description of the Related Art

As the information technology rapidly develops, electronic and optical apparatuses are required, which are faster and more precise. Particularly, the market of portable mobile application products is expanding every year. Among them, mobile phones having a camera mounted thereon tend to adopt a function of digital camera such as autofocusing or optical zoom, as the number of pixels of a sensor increases. Makers focus on developing in order to preoccupy the market.

As an apparatus for driving a camera module for mobile phone, a stepping motor, a VCM, and an piezoelectric ultrasonic motor are representative. In order to implement a rotation motor function, the piezoelectric ultrasonic motor converts simple vibration, such as contraction and expansion, into circular or linear movement by using the friction between a stator and a rotor, the vibration being generated when an electric current is applied to piezoelectric ceramic. The piezoelectric ultrasonic motor has higher energy density, faster response speed, and higher position precision than an electromagnetic driving motor. Further, the piezoelectric ultrasonic motor having an off-power holding function does not make noise at the time of operating and is not affected by an electromagnetic wave.

General characteristics of driving apparatuses for driving a lens of camera module for mobile phones are summarized as in the following Table 1.

Meanwhile, the performance of the friction-drive-type piezoelectric ultrasonic motor is affected by a material of the stator and rotor composed of an elastic body and piezoelectric ceramics. Particularly, when an elastic body of the stator is selected, the ease of processing and the abrasion resistance should be considered.

As the most representative motor, the piezoelectric ultrasonic motor invented by T. Sashida in 1980 has used serrated metal (brass-based) as a material of an elastic body, in order to expand the displacement of piezoelectric ceramics. In such a piezoelectric ultrasonic motor, however, characteristics thereof are degraded by the friction with a rotor, and a driving frequency changes. Particularly, since foreign substances having serious influence on a camera module are generated, a material having high hardness is attached between the stator and rotor or coating is carried out, in order to minimize the foreign substances.

As the related arts regarding the tube type piezoelectric ultrasonic motor, there are provided 'Mechanism comprised of ultrasonic lead screw motor' disclosed in US Patent No. 2005-0052098 and 'An ultrasonic motor using vibration of a short cylinder' disclosed in 'IEEE Transaction on Ultrasonic, Ferrorelectric, and Frequency Control, Vol. 36, No. 5, pp. 517-521' in 1989.

In the piezoelectric actuator disclosed in US Patent No. 2005-0052098, piezoelectric ceramic is attached on a metallic housing corresponding to an elastic body of the present invention, or a piezoelectric tube with four outer electrodes is contained. As described above, however, the housing can be worn down because the metallic elastic body is formed in a tube shape. Further, when the tube is made of piezoelectric ceramic, there are difficulties in manufacturing, and a driving force is not effectively delivered to a rotor because of a low friction index and low mechanical strength of piezoelectric ceramic.

In the ultrasonic motor disclosed in the above paper, a Langevin vibrator used as a driving source is constructed so that metallic bodies are fixed to both sides of two piezoelectric ceramics by bolts. The metallic bodies are formed of stainless steel in order to amplify vibration of the piezoelectric ceramics, and a friction material is inserted therein in order to prevent the abrasion caused by the friction with a rotor formed of brass. In this case, however, the above-described abrasion can still occur, because the metallic bodies serving as an elastic body of a stator are made of a metallic material such as stainless steel.

SUMMARY OF THE INVENTION

An advantage of the present invention is that it provides a stator and a ceramic tube type ultrasonic motor using the same, in which an elastic body of the ultrasonic motor is formed of a ceramic material having excellent abrasion resistance instead of a metallic material, thereby minimizing

TABLE 1

|  | Voice coil motor | DC motor | Stepper motor | Piezo motor |
| --- | --- | --- | --- | --- |
| Size | small | medium | large | small |
| Price | low | medium | high | low |
| Speed | 20 ms | 40 ms | 100 ms | 3 ms |
| Whether to drive in both directions | possible (spring structure) | possible | possible | possible |
| Repetition | high | low | medium | low |
| Decelerator | does not have | have | have | does not have |
| Application | AF and on/off function | AF and zoom | AF and zoom | AF and zoom | abrasion caused by the friction, securing constant operational characteristics, and reducing the number of module parts.

Additional aspects and advantages of the present general inventive concept will be set forth in part in the description which follows and, in part, will be obvious from the description, or may be learned by practice of the general inventive concept.

According to an aspect of the invention, a stator includes a tube-type elastic body that is formed of a ceramic material; and a plurality of piezoelectric diaphragms that are attached on the outer peripheral surface of the elastic body in a longitudinal direction thereof and to which voltages having a phase difference are respectively applied.

According to another aspect of the invention, the piezoelectric diaphragms are formed of the same ceramic material as the elastic body.

According to a further aspect of the invention, the ceramic material is alumina or zirconia.

According to a still further aspect of the invention, the outer peripheral surface of the elastic body is coated with a conductive material such that the piezoelectric diaphragms are electrically connected to each other.

According to a still further aspect of the invention, a ceramic tube type ultrasonic motor includes a stator and a rotor. The stator includes a tube-type elastic body that is formed of a ceramic material; and a plurality of piezoelectric diaphragms that are attached on the outer peripheral surface of the elastic body in a longitudinal direction thereof and to which voltages having a phase difference are respectively applied. The rotor is rotated by the friction with the elastic body flexurally vibrating due to the voltages applied to the plurality of piezoelectric diaphragms.

According to a still further aspect of the invention, the piezoelectric diaphragms are formed of the same ceramic material as the elastic body.

According to a still further aspect of the invention, the ceramic material is alumina or zirconia.

According to a still further aspect of the invention, the outer peripheral surface of the elastic body is coated with a conductive material such that the piezoelectric diaphragms are electrically connected to each other.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
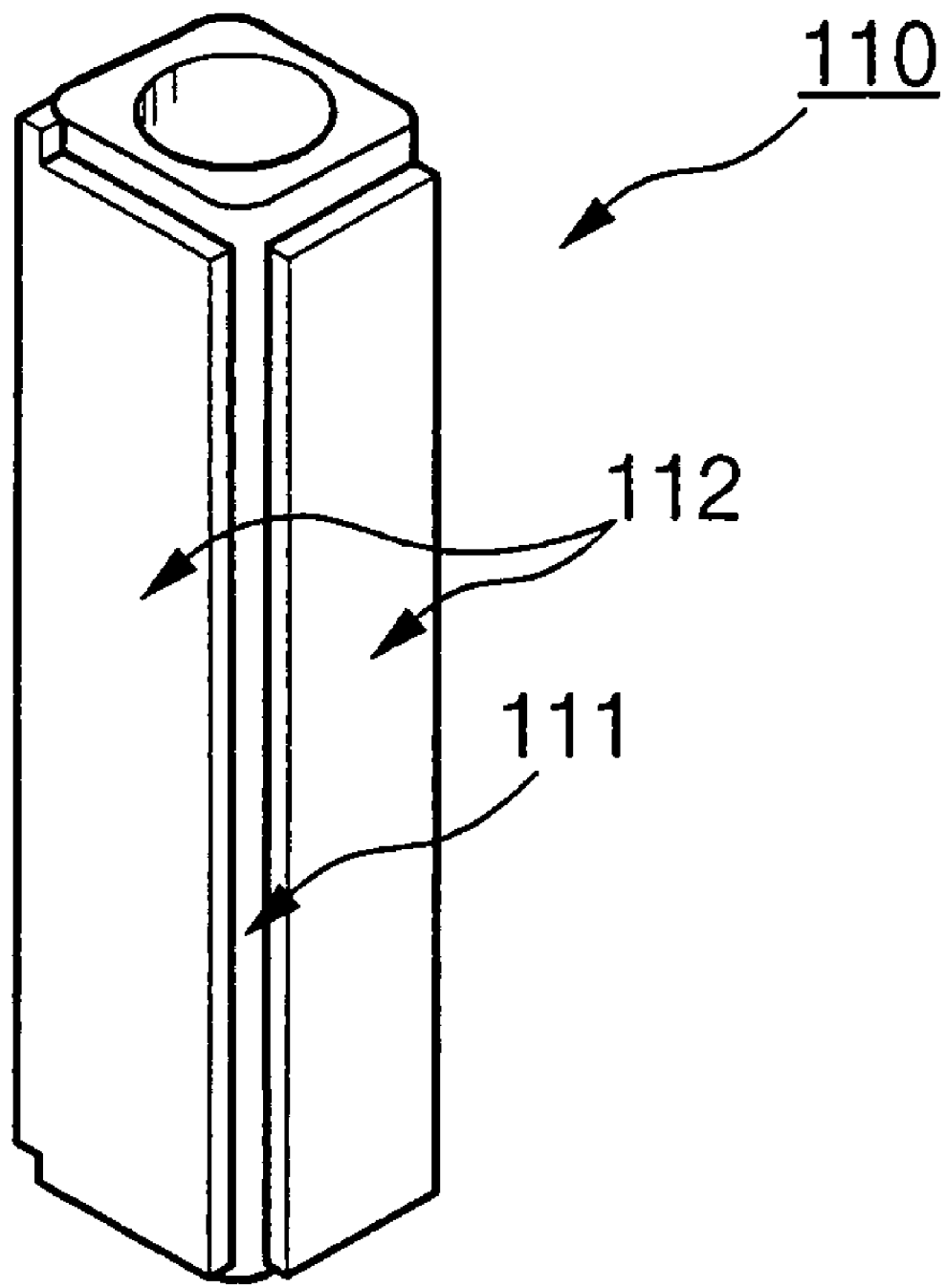
FIG. 1 is a diagram illustrating the construction of a stator used in a ceramic tube type ultrasonic motor according to the present invention.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, preferred embodiments of the present invention will be described in detail with reference to the accompanying drawings.

Stator

FIG. 1 is a diagram illustrating a stator 110 used for a ceramic tube type ultrasonic motor 100 according to the present invention.

As shown in FIG. 1, the stator 110 of the invention includes a tube-type elastic body 111 made of a ceramic material and a plurality of piezoelectric diaphragms 112 which are attached on the outer peripheral surface of the elastic body 111 and to which voltages having a phase difference are respectively applied.

The elastic body 111 of the stator 110 flexurally vibrates due to voltages applied to the plurality of piezoelectric diaphragms 112 attached on the outer peripheral surface of the elastic body 111. While flexurally vibrating, the elastic body 111 rotates the stator in a predetermined direction using a frictional force, the stator coming in contact with the elastic body.

Meanwhile, the elastic body is formed of a ceramic material having excellent abrasion resistance such as alumina or zirconia, different from in the related art. That is, although a portion serving as the elastic body is formed of a metallic material in the related art, the elastic body is manufactured of a ceramic material such as alumina or zirconia having high hardness in the present invention. Therefore, abrasion caused by the friction is minimized, and simultaneously, the length thereof, the number of parts, the number of manufacturing processes and the like can be reduced. Particularly, when the elastic body is formed of a ceramic material as in the present invention, corrosion does not occur, different from an elastic body formed of a metallic material. Further, the elastic body formed of a ceramic material has thermal expansion characteristics similar to those of piezoelectric ceramic, thereby showing excellent characteristics in a reliability test related to temperature, such as a thermal shock test, a high-temperature operation test, or a low-temperature operation test.

The piezoelectric diaphragms 112 of the stator 110 are attached to the outer peripheral surface of the elastic body 111, to which voltages having a phase difference are respectively applied. The piezoelectric diaphragms 112 serve to flexurally vibrate the elastic body 111 using the voltages applied to the piezoelectric diaphragms 112.

The plurality of piezoelectric diaphragms 112 are formed of the same ceramic material as the elastic body 111. As the ceramic material, alumina or zirconia is preferably used.

The plurality of piezoelectric diaphragms (here, four piezoelectric diaphragms are exemplified) 112, which are attached on the elastic body 111 in a longitudinal direction thereof, are installed so that the polarization directions thereof are positioned on the same circumference. At this time, the outer peripheral surface of the elastic body 111 is coated with a conductive material (not shown) such that the respective piezoelectric diaphragms 112 are electrically connected to each other.

When voltage signals having a phase difference are applied to the piezoelectric diaphragms 112, the plurality of piezoelectric diaphragms 112 respectively contract and expand, thereby causing the stator 110 to be flexurally deformed. Then, the rotor 120 connected to the central shaft of the stator 110 is driven.

In the mean time, Table 2 shows results of simulating displacements of the stators of the present invention and the related art, in accordance with a material of the elastic body. As the stator, an elastic body B (the present invention) made of alumina has been used having the same length and size as an elastic body A (the related art) made of stainless steel, the elastic body A having a length of 7.6 mm and a crosssectional size of about 2.5 mm×2.5 mm. The simulation has been performed by Atila version 5.2.2. At this time, a driving voltage of 1 V has been applied.

TABLE 2

| Material | Resonant frequency (kHz) | X axis (m) | Y axis (m) | Z axis (m) | Total (m) |
|---|---|---|---|---|---|
| Stainless steel (A) | 163.158 | 2.28E–07 | 6.53E–07 | 4.89E–07 | 8.01E–07 |
| Alumina (B) | 214.158 | 3.23E–07 | 6.12E–07 | 5.07E–07 | 8.10E–07 |

However, the maximum displacements generated in both ends of the stator 110 are almost the same as each other.

Ceramic Tube Type Ultrasonic Motor

Figure 2:
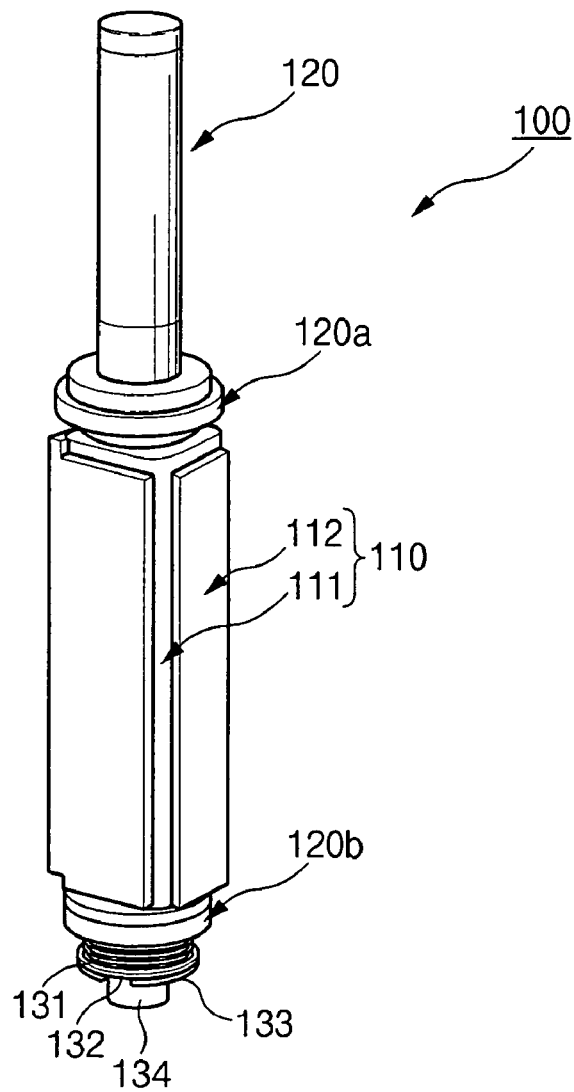
FIG. 2 is a diagram illustrating the construction of the ceramic tube type ultrasonic motor according to the invention.

FIG. 2 is a diagram illustrating a ceramic tube type ultrasonic motor 100 provided with the above-described elastic body according to the present invention.

As shown in FIG. 2, the ceramic tube type ultrasonic motor 100 according to the invention includes the stator 110 and the rotor 120. The stator 110 is provided with the tube-type elastic body 111 made of a ceramic material and the plurality of piezoelectric diaphragms 112 which are attached on the outer peripheral surface of the elastic body 111 and to which voltage having a phase difference are respectively applied. The rotor 120 is rotated by the friction with the elastic body 111 which flexurally vibrates due to the voltages applied to the plurality of piezoelectric diaphragms 112.

As described above, the tube-type elastic body composing the stator 110 is formed of a ceramic material having excellent abrasion resistance. As the ceramic material, alumina, zirconia or the like is preferably used. Further, the piezoelectric diaphragms 112 of the stator 10, attached on the outer peripheral surface of the tube-type elastic body 111, are formed of the same ceramic material as the elastic body 111 formed of a ceramic material. As the ceramic material, alumina, zirconia or the like is preferably used.

The rotor 120, rotated by the friction with the elastic body 111 which flexurally vibrates due to the voltages applied to the plurality of piezoelectric diaphragms 112, includes upper and lower friction surfaces 120*a* and 120*b* which respectively produce friction with the upper and lower surfaces of the elastic body 111. Further, in a portion where the lower friction surface 120*b* of the rotor is formed, or more specifically, between the lower friction surface 120*b* of the rotor 120 and a stopper 134 of the rotor 120, a spring 131, a washer 132, and an E-ring 133 are sequentially installed so as to elastically support the assembled body.

Figure 3:
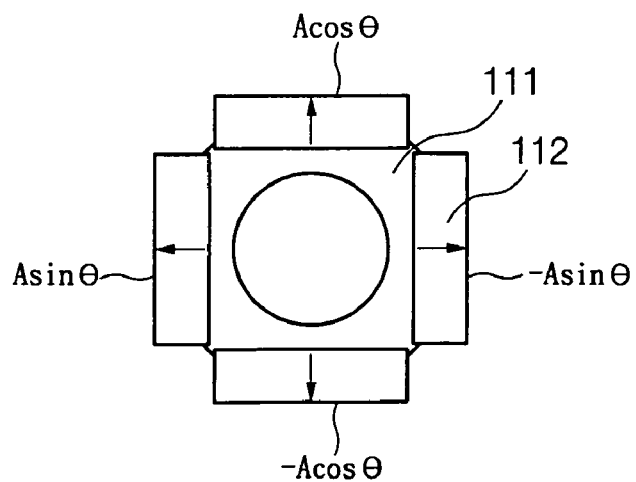
FIG. 3 is a diagram for explaining flexural vibration when a voltage is applied to the stator of the ceramic tube type ultrasonic motor according to the invention.

FIG. 3 is a diagram for explaining flexural vibration when a voltage is applied to the stator 10 of the ceramic tube type ultrasonic motor according to the invention.

The operation of the ceramic tube type ultrasonic motor 100 will be simply described as follows.

That is, if four signals having a predetermined phase difference (for example, 90 degrees) are respectively applied to four of the piezoelectric diaphragms 112 attached on the elastic body 111 formed of a ceramic material, four of the piezoelectric diaphragms 112 respectively generate different vibration due to the voltages having a phase difference.

Therefore, the elastic body 111 (or the stator 110) generates flexural vibration due to the vibration generated by four of the piezoelectric diaphragms 112. As such, the flexural vibration generated by the stator 110 rotates the stator 120 coming in contact with the elastic body 111.

According to the stator and the ceramic tube type ultrasonic motor using the same, the elastic body of the tube type ultrasonic motor is manufactured of a ceramic material having high hardness, thereby minimizing abrasion caused by friction. Further, compared with a conventional ultrasonic motor, it is possible to reduce the length, the number of parts and the number of processes.

Further, since the elastic body is formed of a ceramic material, corrosion does not occur, different from a metallic material. The elastic body has thermal expansion characteristics similar to those of piezoelectric ceramic, thereby showing excellent characteristics in a reliability test related to temperature, such as a thermal shock test, a high-temperature operation test or a low-temperature operation test.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A stator comprising:
   a tube-type elastic body that is formed of a ceramic material; and
   a plurality of piezoelectric diaphragms that are attached on the outer peripheral surface of the elastic body in a longitudinal direction thereof and to which voltages having a phase difference are respectively applied.

2. The stator according to claim 1,
   wherein the piezoelectric diaphragms are formed of the same ceramic material as the elastic body.

3. The stator according to claim 1,
   wherein the ceramic material is alumina or zirconia.

4. The stator according to claim 1,
   wherein the outer peripheral surface of the elastic body is coated with a conductive material such that the piezoelectric diaphragms are electrically connected to each other.

5. A ceramic tube type ultrasonic motor comprising:
   a stator including:
      tube-type elastic body that is formed of a ceramic material; and
      a plurality of piezoelectric diaphragms that are attached on the outer peripheral surface of the elastic body in a longitudinal direction thereof and to which voltages having a phase difference are respectively applied; and
   a rotor that is rotated by the friction with the elastic body flexurally vibrating due to the voltages applied to the plurality of piezoelectric diaphragms.

6. The ceramic tube type ultrasonic motor according to claim 5,
   wherein the piezoelectric diaphragms are formed of the same ceramic material as the elastic body.

7. The ceramic tube type ultrasonic motor according to claim 5,
   wherein the ceramic material is alumina or zirconia.

8. The ceramic tube type ultrasonic motor according to claim 5,
   wherein the outer peripheral surface of the elastic body is coated with a conductive material such that the piezoelectric diaphragms are electrically connected to each other.

* * * * *